United States Patent
Bar-On et al.

(10) Patent No.: US 9,584,987 B1
(45) Date of Patent: Feb. 28, 2017

(54) METHODS AND SYSTEMS FOR SELECTING A TALKGROUP ASSOCIATED WITH A MISSION FOR A PORTABLE COMMUNICATIONS DEVICE

(71) Applicant: MOTOROLA SOLUTIONS, INC., Schaumburg, IL (US)

(72) Inventors: David Bar-On, Rehovot (IL); David H. Kramer, Ginot Shomron (IL); Elena Levin, Givataim (IL)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 14/951,451

(22) Filed: Nov. 24, 2015

(51) Int. Cl.
 *H04W 4/10* (2009.01)
 *H04W 4/08* (2009.01)
 *H04W 76/02* (2009.01)

(52) U.S. Cl.
 CPC ............... *H04W 4/10* (2013.01); *H04W 4/08* (2013.01); *H04W 76/021* (2013.01)

(58) Field of Classification Search
 CPC ....... H04W 4/10; H04W 4/08; H04W 76/005; H04W 4/06; H04W 4/22; H04W 88/02
 USPC .................................................. 455/518–521
 See application file for complete search history.

(56) References Cited

U.S. PATENT DOCUMENTS

| | | | |
|---|---|---|---|
| 6,253,091 B1 | 6/2001 | Naddell et al. | |
| 8,244,782 B2 | 8/2012 | Kuehner et al. | |
| 8,996,053 B2 | 3/2015 | Wiatrowski | |
| 2007/0049314 A1* | 3/2007 | Balachandran | H04W 4/10 455/518 |
| 2011/0016402 A1* | 1/2011 | Dailey | G06F 1/324 715/738 |
| 2014/0143328 A1 | 5/2014 | Miller et al. | |

* cited by examiner

*Primary Examiner* — Philip Sobutka
(74) *Attorney, Agent, or Firm* — Michael Best & Friedrich LLP

(57) ABSTRACT

Methods and systems for selecting a talkgroup for a portable communications device. One method includes storing a set of missions in a memory of the portable communications device and receiving a selection of at least one of the set of missions at the portable communications device and therewith creating a selected mission. The method also includes sending the selected mission to a call controller. The method also includes receiving, from the call controller, a talkgroup identifier associated with the selected mission at the portable communications device.

20 Claims, 6 Drawing Sheets

METHODS AND SYSTEMS FOR SELECTING A TALKGROUP ASSOCIATED WITH A MISSION FOR A PORTABLE COMMUNICATIONS DEVICE

BACKGROUND OF THE INVENTION

Some organizations (e.g., police departments, first responders, and the like) use portable communications devices, such as land mobile radios (LMRs), to facilitate communication between the organization's members. These organizations often place members in different departments and assign members certain roles. Also, an organization may assign members to different communication groups (sometimes referred to as "talkgroups") to streamline communication. In particular, to send a communication to a group of members, a member may send a single communication to an assigned talkgroup rather than sending a communication to individual members.

An organization may have several talkgroups, and these talkgroups need to be pre-programmed and updated as needed into a portable communications device. Once a portable communications device is programmed with talkgroup information, a member may select a talkgroup (e.g., using a selector on the portable communications device) and initiate a communication (e.g., a push-to-talk communication) with the selected talkgroup.

In many organizations, members and/or portable communications devices may be moved and assigned to different departments of the organization. In other situations, a member may be participating in multiple missions for multiple departments. These departments and missions commonly have different talkgroups. However, a member does not have the option to select a list of talkgroups based on the mission or department the member is participating in. Instead, when a member switches missions, departments, or roles, the member's portable communications device needs to be reprogrammed with the applicable talkgroup information.

Accordingly, there is a need for improved methods and systems for selecting a talkgroup for a portable communications device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
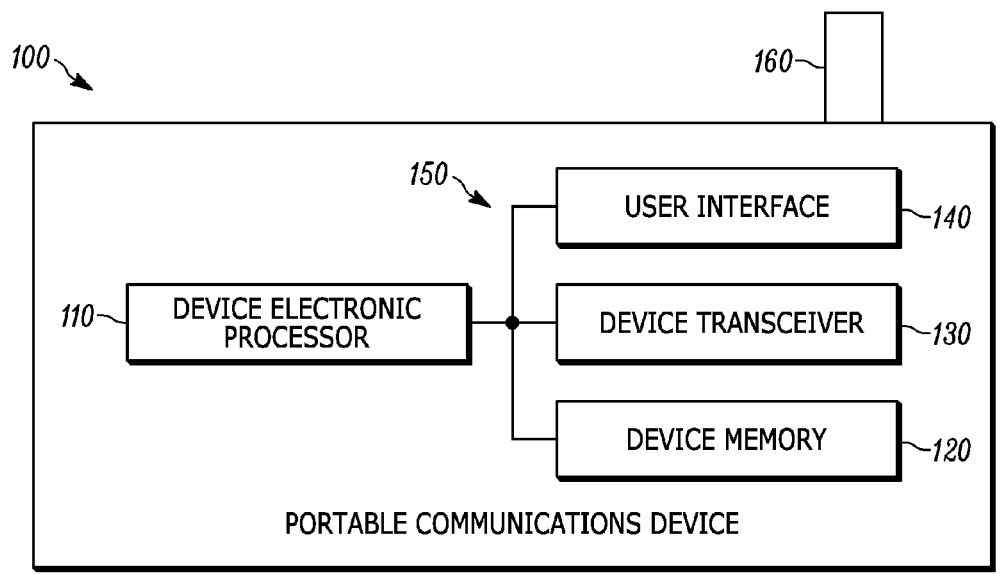
FIG. 1 is a block diagram of a portable communications device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of selecting a talkgroup for a portable communications device. The method includes storing a set of missions in a memory of the portable communications device. The method further includes receiving a selection of at least one mission from the set of missions at the portable communications device and therewith creating a selected mission. The method also includes sending the selected mission to a call controller. The method further includes receiving, from the call controller, a talkgroup identifier associated with the selected mission at the portable communications device.

Another embodiment provides a call controller including a transceiver, an electronic processor coupled to the transceiver, and a memory coupled to the electronic processor. The memory contains instructions that, when executed by the processor, perform a set of functions. The set of functions includes receiving a mission selection from a portable communications device. The set of functions further includes affiliating the portable communications device with a mission identified by the mission selection. The set of functions also includes determining a talkgroup identifier that is associated with the mission. The set of functions further includes sending the talkgroup identifier associated with the mission to the portable communications device via the transceiver, wherein the talkgroup identifier identifies a talkgroup.

Another embodiment provides a portable communications device including a transceiver, an electronic processor coupled to the transceiver, and a memory coupled to the electronic processor. The memory contains instructions that, when executed by the processor, perform a set of functions. The set of functions includes storing a set of missions in a second memory. The set of functions further includes receiving a mission selection of at least one mission included in the set of missions. The set of functions also includes sending the mission selection to a call controller. The set of functions further includes receiving, from the call controller, a talkgroup identifier associated with the mission selection. The portable communications is then able to send and receive communications within a talkgroup identified with the talkgroup identifier via the transceiver.

FIG. 1 is a block diagram of a portable communications device 100. In the illustrated example, the portable communications device 100 includes a device electronic processor 110, a device memory 120, a device transceiver 130, a user interface 140, and an antenna 160. It should be understood that FIG. 1 displays only one exemplary embodiment of a portable communications device 100 and that other embodiments having more or less components are within the scope of this disclosure.

The device electronic processor 110, the device memory 120, the device transceiver 130, and the user interface 140 communicate over a wired or wireless communication bus 150. The device memory 120 is a non-transitory memory that stores instructions that are received and executed by the device electronic processor 110 to carry out functionality of the portable communications device 100. In some embodiments, the device memory 120 also stores data, such as a set of missions, as described below. In other embodiments, the set of missions is stored in a separate memory (e.g., second memory) of the portable communications device 100.

The device transceiver 130 sends and receives data over a wireless communication network, such as a radio network or a cellular network through the antenna 160. The user interface 140 displays data viewable by a user of the portable communications device 100. In some embodiments, the user interface 140 also receives input from a user of the portable communications device 100. For example, in some embodiments, the user interface 140 includes a touch screen.

In certain embodiments, the portable communications device 100 is used in public safety operations by emergency personnel such as fire fighters, emergency first responders, and police officers to communicate over one or more wireless communication networks. For example, in some embodiments, the portable communications device 100 may be a smart telephone, a mobile radio, a cellular telephone, a smart watch, a tablet computer, personal digital assistant (PDA), or any other mobile device. The portable communications device 100 may communicate with other similar portable communications devices or network equipment over one or more wireless communications networks. The one or more wireless communication networks may include a land mobile radio (LMR) network, a terrestrial trunked radio (TETRA) network, or a digital mobile radio (DMR) network. The one or more wireless communication networks may also include a wide area network (WAN) (e.g., a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/ time division multiple access (TDMA)) network, or an Integrated Digital Enhanced Network (iDEN) network, etc.). In other embodiments, the one or more wireless communication networks may include a local area network (LAN), a neighborhood area network (NAN), a home area network (HAN), or personal area network (PAN) employing any of a variety of communications protocols, such as Wi-Fi™, Bluetooth®, ZigBee®, and the like.

Figure 2:
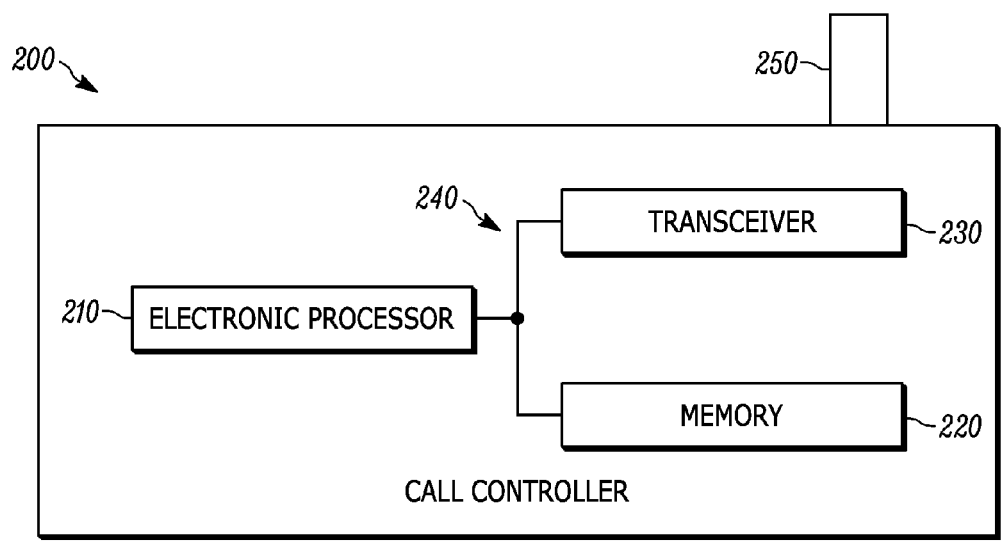
FIG. 2 is a block diagram of a call controller in accordance with some embodiments.

FIG. 2 is a block diagram of a call controller 200. In the illustrated example, the call controller 200 includes an electronic processor 210, a memory 220, and a transceiver 230. The electronic processor 210, the memory 220 and the transceiver 230 communicate over a wired or wireless communication bus 240. The memory 220 is a non-transitory memory that stores instructions that are received and executed by the electronic processor 210 to carry out functionality of the call controller 200. The transceiver 230 sends and receives data over a wireless communication network, such as a radio network or a cellular network through an antenna 250. It should be understood that FIG. 2 displays only one exemplary embodiment of a call controller 200 and that other embodiments having more or less components are within the scope of this disclosure.

In certain embodiments, the call controller 200 may be a central network equipment or a dispatch controller used by a public safety agency such as a fire department or police department. In other embodiments, the call controller 200 may be any network equipment used by an agency, network administrator, or telecommunications provider.

Figure 3:
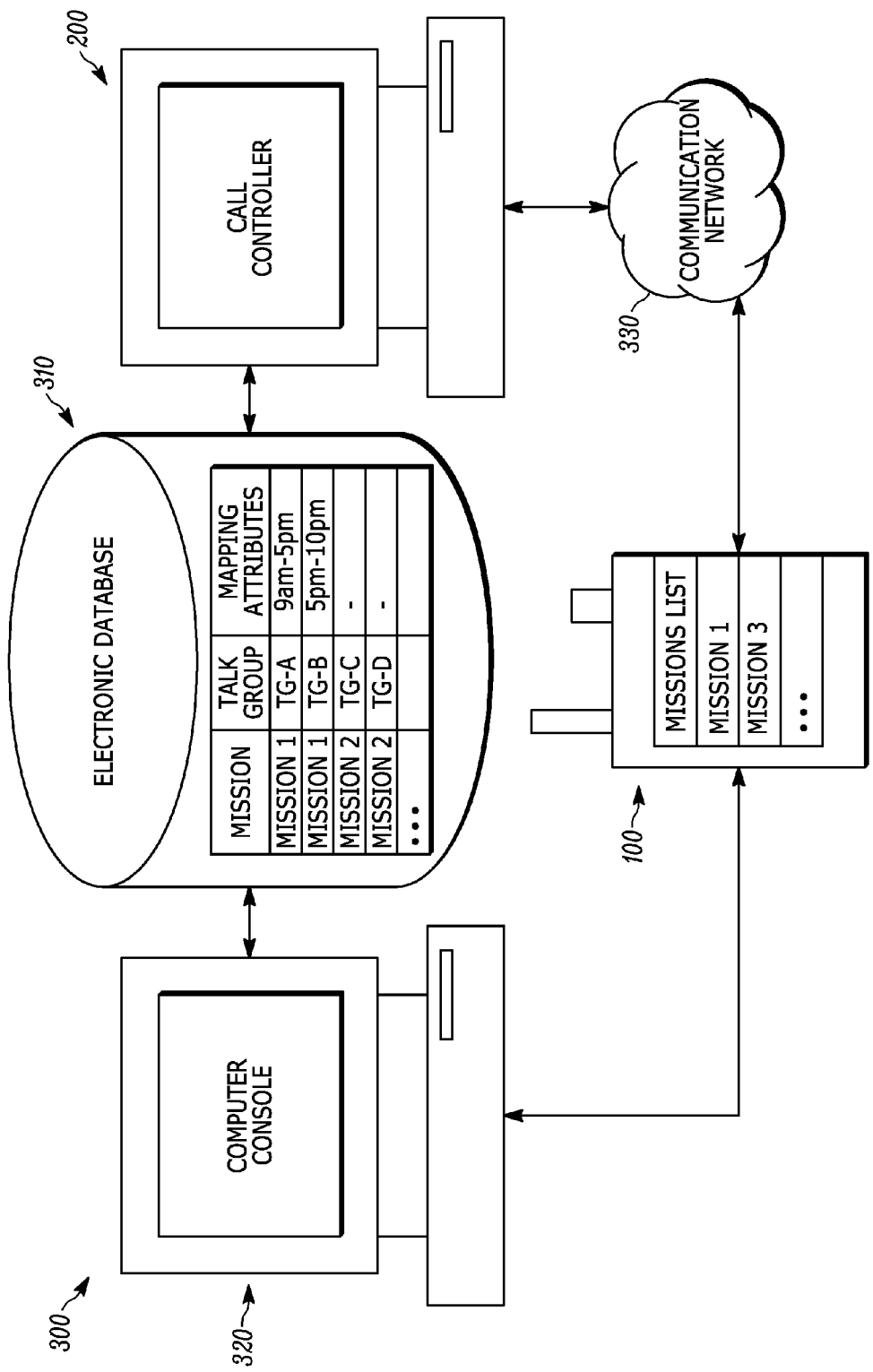
FIG. 3 is a block diagram of a system including the portable communications device of FIG. 1 and the call controller of FIG. 2 in accordance with some embodiments.

FIG. 3 is a block diagram of a system 300 including the portable communications device 100, the call controller 200, and an electronic database 310. The portable communications device 100 sends and receives data from the call controller 200 over a communication network 330 (e.g., a radio network or a cellular network). The call controller 200 sends and receives data from the electronic database 310 using a wired connection or a wireless or wired communication network. The electronic database 310 includes non-transitory memory storing data. In certain embodiments, the electronic database 310 is included in the call controller 200 (e.g., within the memory 220), the portable communications device 100 (e.g., within the device memory 120), or a combination thereof.

Also, in some embodiments, the system 300 includes a computer console 320 that provides an interface to the electronic database 310. Accordingly, a user may use the computer console 320 to view and update the electronic database 310. In some embodiments, the functionality of computer console 320 is performed by the call controller 200. Further, in some embodiments, the computer console 320 may also provide mission configuration data (e.g., mission identifiers) to the portable communications device 100.

The portable communications device 100 sends and receives data from the call controller 200, other portable communications devices, or other network equipment over a communication network 330. As described above, the communication network 330 may be a land mobile radio (LMR) network, a terrestrial trunked radio (TETRA) network, or a digital mobile radio (DMR) network. Alternatively or in addition, the communication network 330 may be a wide area network (WAN) (e.g., a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, etc.). In other embodiments, the communication network 330 may be a local area network (LAN), a neighborhood area network (NAN), a home area network (HAN), or personal area network (PAN) employing any of a variety of communications protocols, such as Wi-Fi™, Bluetooth®, ZigBee®, and the like.

As noted above, the portable communications device 100 communicates with one or more talkgroups. As used in the present application, the term "talkgroup" refers to a virtual radio channel (e.g., frequency channel) that is used for communication between a group of portable communications devices. As also noted above, an organization may have several talkgroups and each talkgroup may be associated with a particular mission of the organization. A mission refers to a task or activity assigned to one or more members of an organization or a sub-division thereof. For example, a talkgroup may include a group of police officers patrolling a predefined neighborhood. Similarly, a talkgroup may include members who have the same role or designation (e.g., police office, detective, paramedic, and the like) within a mission. For example, paramedics and firefighters responding to a distress call may be grouped into two different talkgroups part of the same mission.

As illustrated in FIG. 3, the electronic database 310 stores data about a plurality of missions and a mapping of each of the plurality of missions to one or more talkgroups. The mapping between missions and talkgroups may be based on one or more mapping attributes that have predetermined values. For example, a mission may be mapped to one or more talkgroups based on a time-based mapping attribute that specifies predetermined times when the mission is mapped to a particular talkgroup. In particular, as one example illustrated in FIG. 3, a mission M1 may be associated with a time-based mapping attribute that maps the mission M1 to talkgroup TG-A between the hours of 9 AM and 5 PM and maps the mission M1 to talkgroup TG-B between the hours of 5 PM and 10 PM.

A person skilled in the art will appreciate that a variety of mapping attributes may be used to map missions to talkgroups including, for example, user roles, identifiers of portable communications devices, department assignments, locations, active incidents, other mission selections, and the like. For example, paramedics may be mapped to talkgroups TG-C and TG-D and detectives may be mapped to talkgroup TG-E. Also, in some embodiments, talkgroups may be mapped to a mission based on multiple mapping attributes or without any mapping attributes. For example, paramedics may be mapped to talkgroups TG-C on weekdays and mapped to talkgroup TG-D on weekends. Similarly, a mission M2 may be mapped to talkgroups TG-C and TG-D at the same time without regard to times (e.g., dates, days of the week, times, and the like), user roles, departments, and the like.

Furthermore, in some embodiments, a mission may be mapped to a plurality of talkgroup based on user roles within the mission. For example, a mission for a fire incident M3 may include separate talkgroups for each user role (e.g., paramedics, fire fighters, and supervisors). Therefore, paramedics participating in mission M3 may be assigned to talkgroup TG-P, fire fighters may be assigned to talkgroup TG-F, and supervisors may be assigned to talkgroup TG-S.

Figure 4:
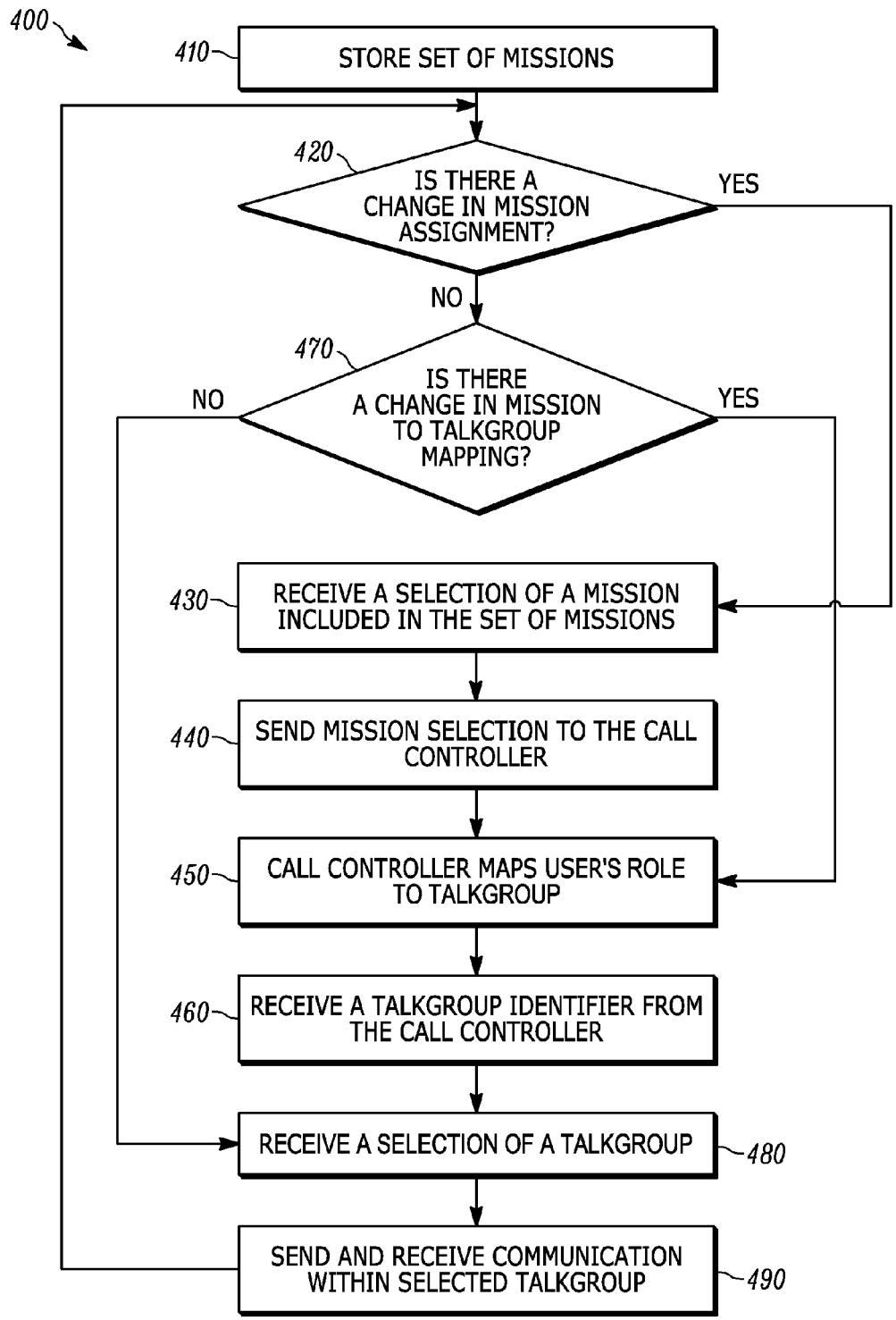
FIG. 4 is a flowchart illustrating a method of selecting a talkgroup for the portable communications device of FIG. 1 using the system of FIG. 3 in accordance with some embodiments.

FIG. 4 is a flowchart illustrating a method 400 of selecting a talkgroup for the portable communications device 100 using the system 300. Although the method 400 is described in conjunction with the system 300 as described in the present application, the method 400 could be used with other systems and devices. In addition, the method 400 may be modified or performed differently than the specific example provided.

In some embodiments, the method 400 is performed by the portable communications device 100 (i.e., the device electronic processor 110). However, it should be understood that the functionality provided in the method 400 may be distributed between the device electronic processor 110 of the portable communications device 100 and the electronic processor 210 of the call controller 200 in various configurations. Additional electronic processors may also be included in the portable communications device 100 and/or call controller 200 that perform all or a portion of the method 400.

The method 400 includes storing a set of missions in a memory of the portable communications device 100 (at block 410). In some embodiments, the set of missions is stored in the device memory 120 of the portable communications device 100. The set of missions may be received from the call controller 200. In other embodiments, the set of missions may be preprogrammed in the portable communications device 100 (e.g., received from the computer console 320). The set of missions includes identifiers (e.g., mission names) for one or more missions assigned to the portable communications device. In some embodiments, the portable communications device 100 displays the set of missions (or a portion thereof) on the user interface 140.

In certain embodiments, the portable communications device 100 may also store a set of user roles in the device memory 120. The set of user roles may be received from the call controller 200. In other embodiments, a user role or a set of user roles may be preprogrammed in the portable communications device 100 (e.g., received from the computer console 320).

The missions assigned to the portable communications device 100 may change over time. For example, upon receiving a distress call from a fire, a fire fighter's portable communications device 100 may be assigned to a new mission associated with responding to the distress call (e.g., by the computer console 320). In other embodiments, the call controller 200 may determine when there is a change in the mission assignment for the portable communications device 100 (e.g., the addition or deletion of an assigned mission) and alert the portable communications device 100 of the change (e.g., with an invitation to join an ongoing or future mission).

Accordingly, the portable communications device 100 determines whether there is change in the mission assignment (at block 420) (e.g., based on data received from the computer console 320, the call controller 200, a call, or a combination thereof). When there is a change in the mission assignment, the portable communications device 100 receives a selection of one of the missions included in the set of missions (i.e., a mission selection) (at block 430). In certain embodiments, the portable communications device 100 may receive a selection of a mission upon accepting an invitation to join the mission from the call controller 200. In other embodiments, the portable communications device 100 receives the mission selection through the user interface 140. For example, the user interface 140 may display a list of assigned or unassigned missions and receive a selection of one of the displayed missions. In yet other embodiments, the portable communications device 100 receives a selection of mission from the computer console 320.

The portable communications device 100 sends the mission selection to the call controller 200 (at block 440). In some embodiments, the portable communications device 100 sends the mission selection by transmitting an identifier of the selected mission to the call controller 200 via the device transceiver 130.

As noted above, in some embodiments, the portable communications device 100 may also be associated with a user role within the context of a mission (e.g., detective, supervisor, officer, and the like). Accordingly, in some embodiments, the portable communications device 100 may send a currently-assigned user role in addition to sending the mission selection. As described above, the call controller 200 uses any received user role as a mapping attribute for identifying a talkgroup for the portable communications device 100. It should be understood that the portable communications device 100 may send an automatically-assigned user role for a mission (e.g., as received from the computer console 32) or send a manually-selected user role (e.g., selected through the user interface 140). For example, the user interface 140 may display the set of user roles stored in the portable communications device 100 and receive a selection of one of the displayed user roles. Also, in some embodiments, in addition to or as an alternative to receiving a user role selection from the portable communications device 100, the call controller 200 may determine a user role associated with the portable communications device 100 based on data received from other sources (e.g., the electronic database 310, the computer console 320, and the like).

The call controller 200 receives the mission selection and affiliates the portable communications device 100 with the selected mission. The call controller 200 may affiliate the portable communications device 100 with the selected mission by verifying whether the portable communications device 100 (or a user of the portable communications device 100) has permission to join the selected mission and any associated talkgroups. Affiliating the portable communications device 100 with the selected mission may also include storing information (e.g., in the memory 220 of the call controller 200, the electronic database 310, or a combination thereof) that maps the portable communications device 100 to the selected mission, a particular talkgroup mapped to the mission, or a combination thereof. As described in more detail below, the call controller 200 uses this stored information to provide the portable communications device 100 with updated talkgroup identifiers.

The call controller 200 also maps the selected mission to a talkgroup (at block 450). In some embodiments, the call controller 200 maps the selected mission to a talkgroup based on a role associated with the user of the portable communications device 100. As described above, user role information may be transmitted by the portable communications device (e.g., with the mission selection) or retrieved by the call controller 200. For example, in some embodiments, if a mission is mapped to a talkgroup based on a user role, the call controller 200 can query the portable communications device 100 or another device (e.g., the electronic database 310) for a user role associated with the portable communications device 100. In other embodiments, all users participating in the selected mission may be grouped into one talkgroup irrespective or their role or department. Accordingly, as used in the present application, a user role may be considered a mapping attribute for mapping the mission selection to a talkgroup.

The call controller 200 uses the data stored in the electronic database 310 to identify a talkgroup associated with the selected mission (and, optionally, the user's role). Also, as noted above, a talkgroup may be mapped to a mission based on a mapping attribute. For example, a mission may be associated with a location-based mapping attribute that maps the mission to talkgroup TG-A for a patrolling zone Z1 and maps the mission to talkgroup TG-B for a patrolling zone Z2. Accordingly, the call controller 200 uses the data stored in the electronic database 310 to identify the currently-applicable talkgroup identifier mapped to the mission selection in view of any mapping attributes. For example, using the above example, when the call controller 200 receives the mission selection when the portable communications device is in zone Z1, the call controller 200 maps the mission selection to talkgroup TG-A. Alternatively, when the call controller 200 receives the mission selection when the portable communications device is in zone Z2, the call controller 200 maps the mission selection to talkgroup TG-B.

When the call controller 200 maps the portable communications device 100 with the selected mission, the call controller 200 sends a talkgroup identifier to the portable communications device 100. The talkgroup identifier identifies a talkgroup associated with the selected mission based on any applicable mapping attributes (including, for example, an assigned user role).

As illustrated in FIG. 4, the portable communications device 100 receives the talkgroup identifier (at block 460) and applies the talkgroup identifier. For example, in some embodiments, the portable communications device 100 is automatically programmed to transmit and receive communications (e.g., push-to-talk communications) based on the received talkgroup identifier (e.g., the portable communications device stores the received talkgroup identifier as the currently-selected talkgroup) (at block 490). In other embodiments, to apply or use a particular talkgroup identifier, the user of the portable communications device 100 selects the talkgroup identifier (e.g., through the user interface 140 or another input mechanism of the portable communications device 100) (at block 480). In some embodiments, as described below, the portable communications device 100 uses the call controller 200 to connect with a talkgroup.

When there is no change in the mission assignment, the portable communications device 100 or the call controller 200 determines whether there is a change in the mission mappings stored in the electronic database 310 (at block 470). The mission mappings may be changed based on a change in a mapping attribute or due to user-initiated change in the electronic database 310 (e.g., a change in the mapping performed through the computer console 320). As noted above, a talkgroup may be mapped to a mission by a mapping attribute that specifies when the talkgroup is applicable for the mission (e.g., when the user is assigned a particular role or assigned to a particular department, during particular times or particular days, when the device is in particular locations and the like). Accordingly, after sending a talkgroup identifier that is associated with a mapping attribute, the call controller 200 may automatically detect when current values of the mapping attribute (e.g., a current user role or department, time and date, location and the like) change and automatically compares these current values to the predetermined values of the mapping attribute to determine whether the previously-sent talkgroup identifier is no longer valid.

For example, assuming that a mission is associated with a time-based mapping attribute that maps the mission to talkgroup TG-A between the hours of 9 AM and 5 PM and maps the mission to talkgroup TG-B between the hours of 5 PM and 10 PM, the call controller 200 sends a first talkgroup identifier identifying talkgroup TG-A in response to receiving a mission selection at 3 PM. Thereafter, the call controller 200 compares the current time to the times specified by the time-based mapping attribute (i.e., 9 AM and 5 PM) and detects when the current time fails to satisfy the times specified by the mapping attribute. When this occurs, the call controller 200 identifies a new talkgroup identifier to replace the previously-sent talkgroup identifier, which is no longer valid. In particular, when it is 5 PM, the call controller 200 automatically sends a second talkgroup identifier identifying talkgroup TG-B to the portable communications device 100 to replace the first talkgroup identifier. Accordingly, the call controller 200 uses the stored affiliation information and the mapping attributes to automatically provide the portable communications device 100 with an updated talkgroup identifier.

In other embodiments, the portable communications device 100 may automatically identify when a previously-received talkgroup identifier is no longer valid (e.g., no longer applicable based on the location of the portable communications device 100) as described above for the call controller 200 and automatically request a new talkgroup identifier from the call controller 200 when a previously-received talkgroup identifier is no longer valid. In particular, in addition to receiving a talkgroup identifier, the portable communications device 100 may receive a mapping attribute (including the predetermined values) that instruct the portable communications device 100 when to use the received talkgroup identifier. For example, the portable communications device 100 may receive a location-based mapping attribute that specifies that the received talkgroup identifier is only valid when the portable communications device 100 is in zone Z1. Accordingly, in these situations, the portable communications device 100 compares current values of mapping attributes (e.g., user role, department, time, location and the like) to the predetermined values associated with the received mapping attribute to identify whether a new talkgroup identifier should be requested from the call controller 200. In particular, when the current value of the mapping attribute (e.g., a current date or time, or a current location) fails to satisfy the predetermined value of the received mapping attribute, the portable communications device 100 requests a new talkgroup identifier from the call controller 200 (e.g., by transmitting a mission selection as described above).

Alternatively, the portable communications device 100 may receive multiple talkgroup identifiers from the call controller 200 and may apply the appropriate talkgroup identifiers by comparing current values of mapping attributes to received predetermined values of the mapping attributes. For example, using the above situation, the portable communications device 100 may automatically initially receive both the first and the second talkgroup identifiers and automatically apply one of the identifiers based on the current time of day or current location of the portable communications device 100.

Similarly, in some embodiments, the mapping between missions and talkgroups may be updated in the electronic database 310. For example, the mapping between mission and talkgroups may be viewed and dynamically updated by a user through the computer console 320. Upon detecting a change in the mapping between missions and talkgroups, the call controller 200 sends new talkgroup identifiers associated with the selected mission to the portable communications device 100. The portable communications device 100 then stores these new talkgroup identifiers (e.g., in place of the previous talkgroup identifiers). Alternatively or in addition, the portable communications device 100 may query the call controller 200, the computer console 320, or a combination thereof to determine whether there is change in mission assignment (to block 420) and whether there is a change in the mission to talkgroup mapping (to block 470).

Figure 5:
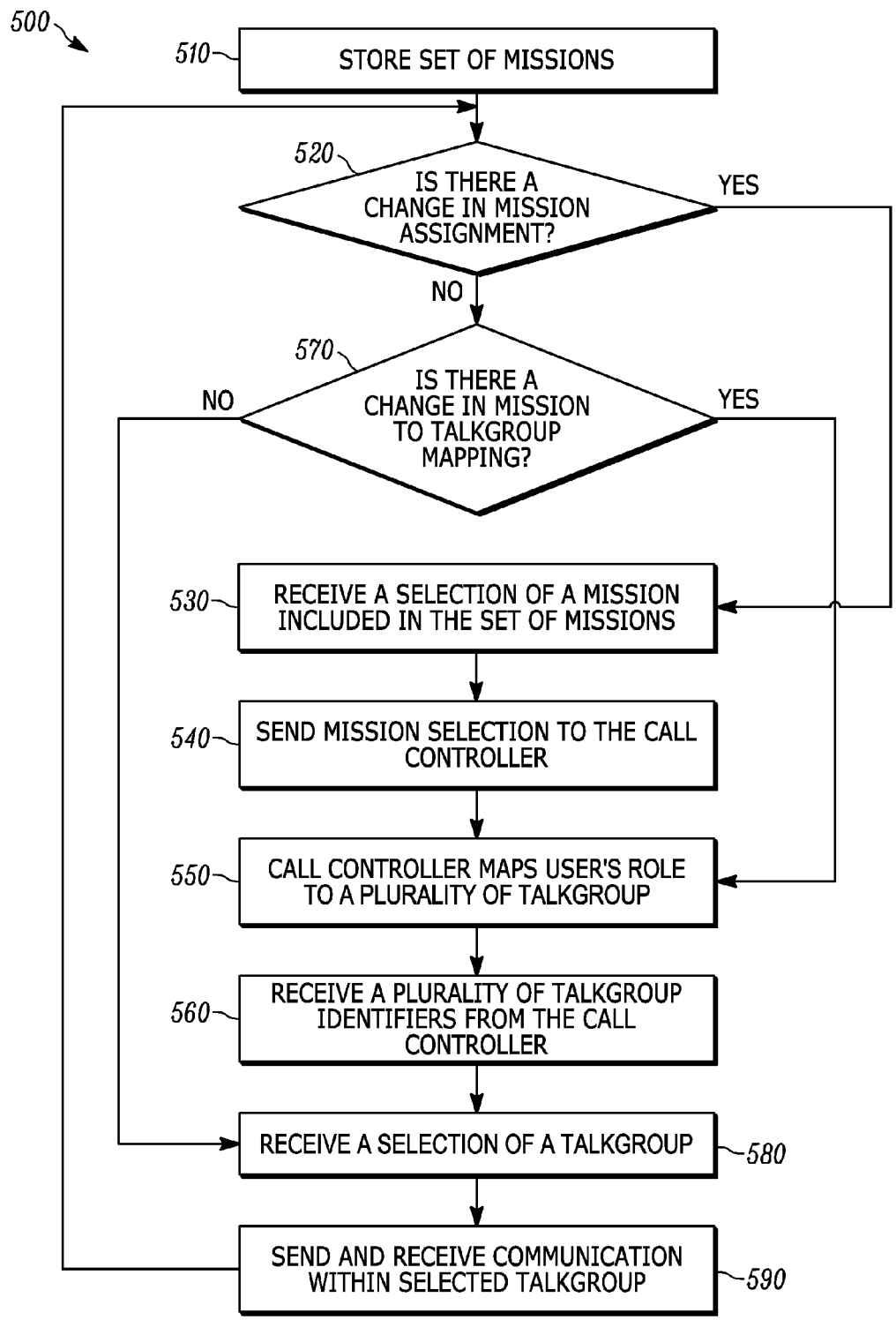
FIG. 5 is a flowchart of another method of selecting a talkgroup for the portable communications device of FIG. 1 using the system of FIG. 3 in accordance with some embodiments.

Also, in some embodiments, a plurality of talkgroups may be mapped to a mission and a user of the portable communications device 100 may select one of the plurality of talkgroups (as the currently-selected talkgroup). For example, FIG. 5 is a flowchart illustrating a method 500 of selecting a mission and a talkgroup on the portable communications device 100 using the system 300. Again, although the method 500 is described in conjunction with the system 300 as described in the present application, the method 500 could be used with other systems and devices. In addition, the method 500 may be modified or performed differently than the specific example provided.

In some embodiments, the method 500 is performed by the portable communications device 100 (i.e., the device electronic processor 110). However, it should be understood that the functionality provided in the method 500 may be distributed between the device electronic processor 110 of the portable communications device 100 and the electronic processor 210 of the call controller 200 in various configurations. Additional electronic processors may also be included in the portable communications device 100 and/or call controller 200 that perform all or a portion of the method 500.

As illustrated in FIG. 5, the method 500 includes storing a set of missions (at block 510) and determining whether there is a change in mission assignment (at block 520) as described above with respect to the method 400. As also described above with respect to the method 400, when the portable communications device 100 determines that there is a change in the mission assignment, the portable communications device 100 receives a mission selection (at block 530) and transmits the mission selection to the call controller 200 (at block 540). The call controller 200 affiliates the portable communications device 100 with the selected mission. However, in response to the mission selection, the call controller 200 maps the selected mission and the role of the user of the portable communications device 100 to a plurality of talkgroups (at block 550) and sends a plurality of talkgroup identifiers to the portable communications device 100 (at block 560). The plurality of talkgroup identifiers may include mapping attributes that instruct the portable communications device 100 when to use a particular talkgroup identifier.

Upon receiving the plurality of talkgroup identifiers (at block 560), the portable communications device 100 may store the plurality of talkgroup identifiers to a memory, such as the device memory 120. The portable communications device 100 also displays the plurality of talkgroups (e.g., on the user interface 140). The portable communications device 100 receives a selection of a talkgroup (at block 580). A user of the portable communications device 100 may select a talkgroup from the plurality of talkgroup identifiers to initiate a communication (e.g., a push-to-talk communication) or receive a communication transmitted to the selected talkgroup (at block 590). A user may select one of the plurality of talkgroup identifiers through the user interface 140 or another input mechanism of the portable communications device 100, such as a rotatable knob or button. Upon selecting one of the plurality of talkgroup identifiers, the portable communications device 100 applies the talkgroup identifier as described above.

When there is no change in mission assignment, the portable communications device 100 determines whether there is a change in the mission mapping (at block 570) as described above with respect to method 400.

Further, in some embodiments, the portable communications device 100 may be affiliated with multiple missions.

Figure 6:
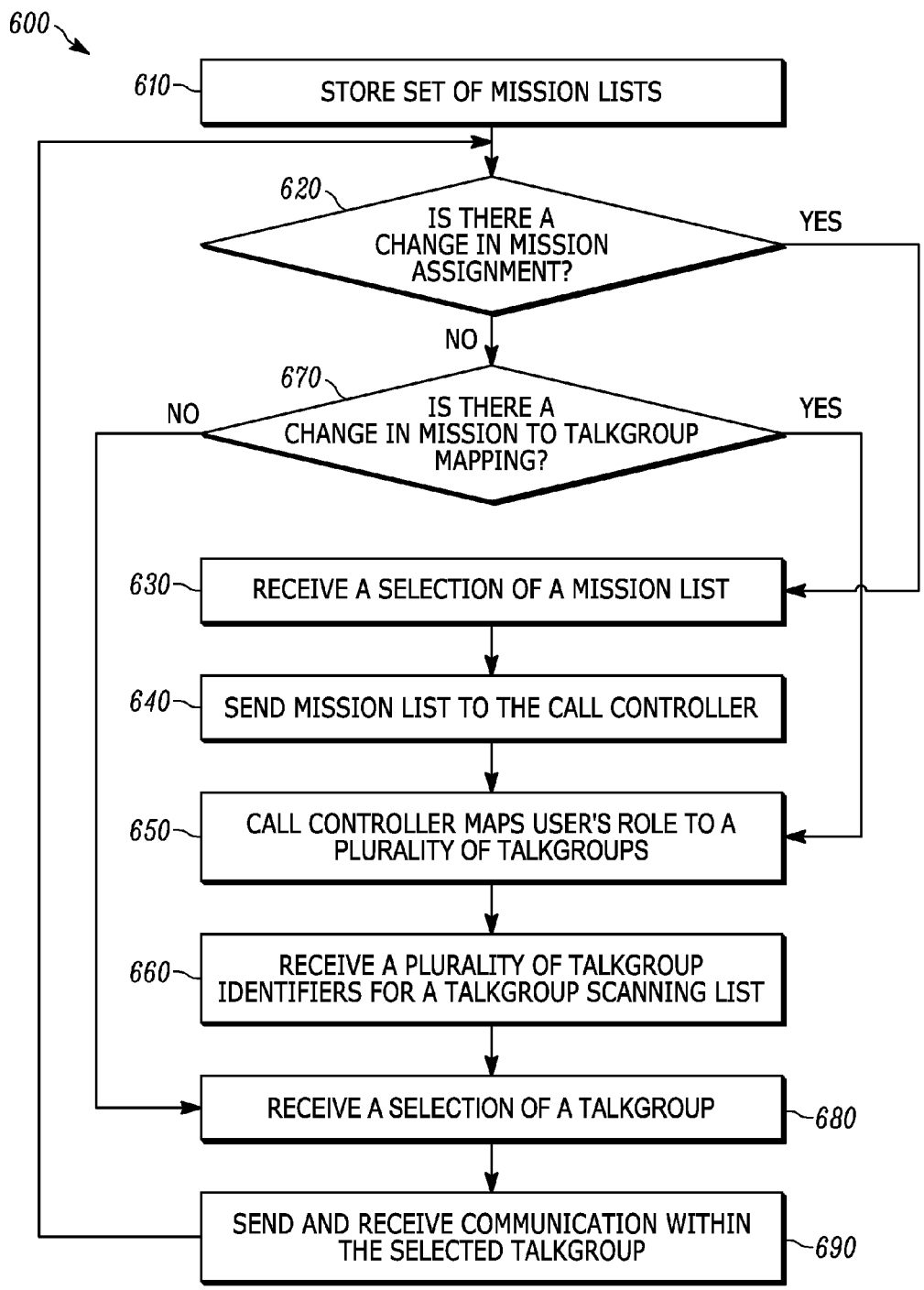
FIG. 6 is a flowchart of a method of affiliating the portable communications device of FIG. 1 with multiple missions using the system of FIG. 3 in accordance with some embodiments.

For example, FIG. 6 is a flowchart of a method 600 of affiliating the portable communications device 100 with multiple missions (e.g., in parallel) using the system 300. Again, although the method 600 is described in conjunction with the system 300 as described in the present application, the method 600 could be used with other systems and devices. In addition, the method 600 may be modified or performed differently than the specific example provided.

In some embodiments, the method 600 is performed by the portable communications device 100 (i.e., the device electronic processor 110). However, it should be understood that the functionality provided in the method 600 may be distributed between the device electronic processor 110 of the portable communications device 100 and the electronic processor 210 of the call controller 200 in various configurations. Additional electronic processors may also be included in the portable communications device 100 and/or call controller 200 that perform all or a portion of the method 600.

As illustrated in FIG. 6, the method 600 includes storing a set of mission lists, wherein each mission list includes a plurality of missions (at block 610). The portable communications device determines whether there is a change in the mission assignment (at block 620). When there is a change in the mission assignment, the portable communications device receives a selection of a mission list (including, for example, a first mission and a second mission) (at block 630). The portable communications device 100 sends the mission list selection to the call controller 200 (at block 640). In some embodiments, the portable communications device 100 sends the mission list selection by transmitting an identifier of the mission list, identifiers of the plurality of missions included in the mission list, or a combination thereof.

As described above with respect to methods 400 and 500, the call controller 200 affiliates the portable communications device 100 with each mission included in the mission list selection and sends a plurality of talkgroup identifiers to the portable communications device, wherein the plurality of talkgroup identifiers includes one or more talkgroup identifiers associated with each mission included in the mission list selection. The call controller 200 maps each mission from the missions to at least one talkgroup (at block 650) as described above with respect to method 400. The call controller 200 then transmits the resulting plurality of talkgroups to the portable communications device 100. The portable communications device 100, upon receiving the plurality of talkgroup identifiers (at block 660), applies the plurality of talkgroup identifiers as described above (e.g., storing the plurality of talkgroup identifiers as a scanning list). As also described above with respect to method 500, a user of the portable communications device 100 may select a talkgroup from the plurality of talkgroup identifiers (i.e., the scanning list) (at block 680) to initiate a communication (e.g., a push-to-talk communication) (at block 690). A user may select one of the plurality of talkgroup identifiers through the user interface 140 or another input mechanism of the portable communications device 100, such as a rotatable knob or button. The portable communications device 100 also uses the plurality of talkgroup identifiers (i.e., the scanning list) to identify what talkgroups to join (i.e., receive initiated communications).

When there is no change in the mission assignment, the portable communications device 100 determines whether there is a change in the mission mappings (at block 670) as described above with respect to method 400.

In some embodiments, when the user of the portable communications device 100 selects a talkgroup (i.e., selects a talkgroup identifier previously-received from the call controller 200 as part of the method 400, 500, or 600) to initiate a communication to, the portable communications device 100 sends a request to connect to the selected talkgroup to the call controller 200, and the call controller 200 establishes a connection between the portable communications device 100 and the selected talkgroup. In some embodiments, the call controller 200 also verifies that the selected talkgroup is currently valid and that the user of the portable communications device 100 is authorized to connect to the talkgroup. Also, it should be understood that, in some embodiments, the portable communications device 100 communicates with a device separate from the call controller 200 to connect to a selected talkgroup.

In some embodiments, the portable communications device 100 may have a rotatable knob or other input interface for selecting a talkgroup. For example, the rotatable knob may be associated with a plurality of positions, wherein each position is associated with a talkgroup identifier or a plurality of talkgroup identifiers (e.g., a scanning list). Accordingly, when the portable communications device 100 receives one or a plurality of talkgroup identifiers from the call controller 200, the portable communications device 100 may be configured to assign one or a plurality of talkgroup identifiers (e.g., a talkgroup scanning list) to a position of the rotatable knob. Similarly, available talkgroups displayed by the user interface 140 may be automatically updated or re-ordered based on talkgroup identifiers received from the call controller 200. Other techniques of assigning and selecting talkgroups on the portable communications device 100 may also be used.

Figure 7:
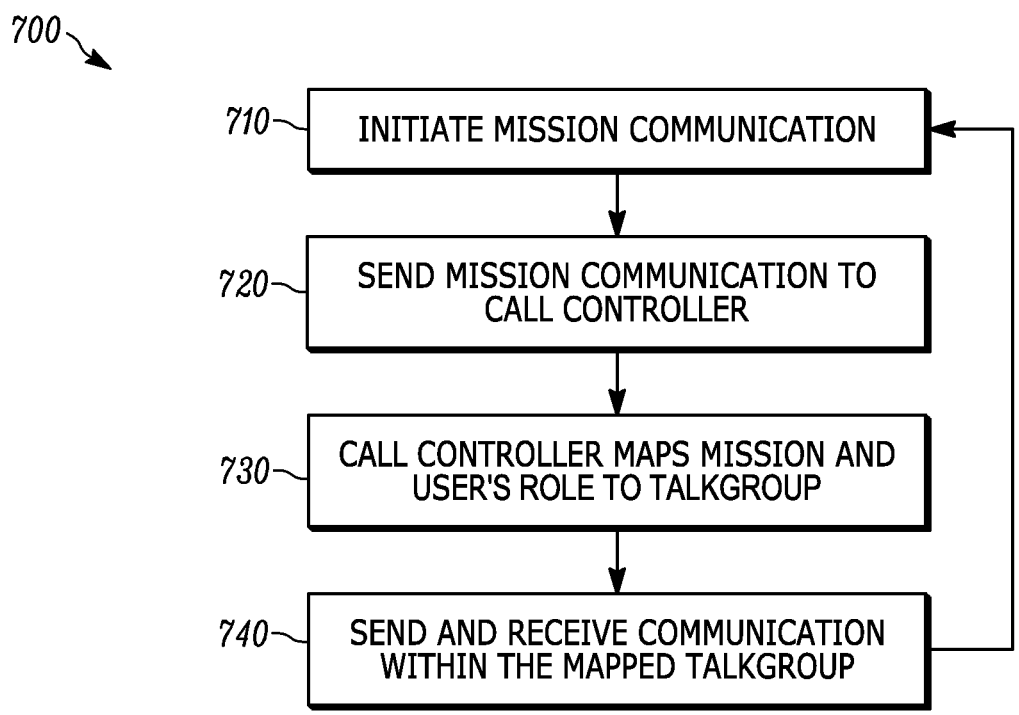
FIG. 7 is a flowchart of method of initiating a call to a mission by the portable communications device of FIG. 1 using the system of FIG. 3 in accordance with some embodiments.

In some embodiments, the portable communications device 100 may initiate a call to a mission rather than to a particular talkgroup. For example, FIG. 7 is a flowchart of a method 700 of initiating a call to a mission by the portable communications device 100 using the system 300. Although the method 700 is described in conjunction with the system 300 as described in the present application, the method 700 could be used with other systems and devices. In addition, the method 700 may be modified or performed differently than the specific example provided.

In some embodiments, the method 700 is performed by the portable communications device 100 (i.e., the device electronic processor 110). However, it should be understood that the functionality provided in the method 700 may be distributed between the device electronic processor 110 of the portable communications device 100 and the electronic processor 210 of the call controller 200 in various configurations. Additional electronic processors may also be included in the portable communications device 100 and/or call controller 200 that perform all or a portion of the method 700.

The method 700 includes initiating a communication (e.g., a call) to a mission (at block 710). A communication to a mission may be initiated, for example, by a user selecting a mission through the user interface 140 and pushing a push-to-talk button on the portable communications device 100. The portable communications device 100 sends the initiated communication to the call controller 200 (at block 720). The call controller 200 maps the mission and optionally, a role of the user of the portable communications device 100 to a talkgroup (at block 730). The call controller 200 then initiates the communication with the talkgroup associated with the mission (at block 740). Therefore, even if a portable communications device 100 has not previously been affiliated with a mission through the call controller 200, the portable communications device 100 may initiate a call to the mission. Also, in some embodiments, when the portable communications device 100 initiates a call to a mission, the call controller 200 may automatically affiliate the portable communications device 100 with the mission and, optionally, may send the portable communications device 100 one or a plurality of talkgroup identifiers mapped to the mission as described above. Accordingly, after initially sending a communication to a mission, the portable communications device 100 may be able to initiate communications directly to a talkgroup associated with the mission (rather than the mission itself).

Similarly, in some embodiments, the portable communications device 100 may initiate or receive a communication associate with a talkgroup without being affiliated with the mission mapped to talkgroup. In this situation, the call controller 200 may inform the portable communications device 100 that the talkgroup is mapped to a particular mission (automatically or in response to query from the portable communications device 100) and may, optionally, affiliate the portable communications device 100 with the mapped missions (e.g., when the portable communications device 100 is not already affiliated).

Accordingly, the methods described herein select a talkgroup for a portable communications device based on a selected mission and mappings that map a mission to one or more talkgroups. The mappings used to map a mission to one or more talkgroup may be associated with mapping attributes that satisfy further criteria for mapping a mission to one or more talkgroups. As described above, the mapping attributes may include user roles (e.g., selected by a user of the portable communications device or preprogrammed into the portable communications device), dates, times, locations, and the like. Furthermore, as described above, as missions, mappings, and mapping attributes may change, a portable communications device is automatically updated based on these updates. This functionality allows organizations to more easily change and update missions, talkgroups, and mapping attributes (including user roles) and allows a portable communications device (and the user of the portable communications device) to more easily and efficiently navigate and identify a relevant talkgroup.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of selecting a talkgroup for a portable communications device, the method comprising:
storing a set of mission identifiers in a memory of the portable communications device;
receiving a selection of at least one mission identifier from the set of mission identifiers at the portable communications device and therewith creating a selected mission identifier;
sending the selected mission identifier to a call controller; and
receiving, from the call controller, a talkgroup identifier associated with the selected mission identifier at the portable communications device.

2. The method of claim 1, further comprising sending and receiving communications with the portable communications device within a talkgroup identified with the talkgroup identifier.

3. The method of claim 1, wherein receiving the talkgroup identifier associated with the selected mission identifier includes:
receiving a plurality of talkgroup identifiers associated with the selected mission identifier;
receiving a selection of at least one of the plurality of talkgroup identifiers at the portable communications device; and
sending the selection of at least one of the plurality of talkgroup identifiers to the call controller.

4. The method of claim 1, wherein receiving the talkgroup identifier includes:
receiving a mapping attribute associated with the talkgroup identifier, the mapping attribute mapping the talkgroup identifier to a predetermined value;
automatically comparing a current value to the predetermined value; and
automatically requesting a second talkgroup identifier from the call controller when the current value fails to satisfy the predetermined value.

5. The method of claim 1, further comprising:
automatically receiving a second talkgroup identifier from the call controller at the portable communications device, wherein the second talkgroup identifier replaces the talkgroup identifier.

6. The method of claim 1, wherein receiving the selection of the at least one mission identifier from the set of mission identifiers includes receiving a selection of a mission identifier list, wherein the mission identifier list includes a plurality of mission identifiers and wherein receiving the talkgroup identifier includes receiving at least one talkgroup identifier for each of the plurality of missions identifiers included in the mission identifier list.

7. The method of claim 1, wherein the call controller is in communication with an electronic database storing a mapping between the selected mission identifier and the talkgroup identifier, further comprising:
determining that the mapping has been updated; and
receiving, from the call controller, a second talkgroup identifier when the mapping is updated.

8. The method of claim 1, further comprising sending a user role associated with the portable communications device to the call controller, wherein receiving the talkgroup identifier includes receiving a talkgroup identifier associated with the selected mission identifier and the user role at the portable communications device.

9. A call controller comprising:
a transceiver;
an electronic processor; and
a memory coupled to the electronic processor and containing instructions that, when executed by the electronic processor, perform a set of functions including:
receiving a mission identifier selection from a portable communications device,
affiliating the portable communications device with a mission identified by the mission identifier selection,
determining a talkgroup identifier associated with the mission, and
sending the talkgroup identifier associated with the mission to the portable communications device via the transceiver, wherein the talkgroup identifier identifies a talkgroup.

10. The call controller of claim 9, wherein a plurality of talkgroups are associated with the mission identifier selection, the memory further comprising instructions, that when executed by the electronic processor perform a set of functions including:
sending a plurality of talkgroup identifiers to the portable communications device, wherein each one of the plurality of talkgroup identifiers identifies one of the plurality of talkgroups, and
receiving a request from the portable communications device to connect to at least one of the plurality of talkgroups.

11. The call controller of claim 9, the memory further comprising instructions, that when executed by the electronic processor perform a set of functions including:
receiving a selection of a mission identifier list from the portable communications device,
affiliating the portable communications device with the mission identifier list,
determining at least one talkgroup identifier associated with each mission included in the mission identifier list, and
sending the at least one talkgroup identifier associated with each mission to the portable communications device via the transceiver.

12. The call controller of claim 9, the memory further comprising instructions, that when executed by the electronic processor perform a set of functions including:
comparing a current value of a mapping attribute with a predetermined value of the mapping attribute associated with the talkgroup identifier, and
when the current value of the mapping attribute fails to satisfy the predetermined value of the mapping attribute, send a second talkgroup identifier to the portable communications device.

13. The call controller of claim 9, wherein the call controller is in communication with an electronic database storing a mapping between the mission identifier selection and the talkgroup identifier, the memory further comprising instructions, that when executed by the electronic processor perform a set of functions including:
detecting a change in the mapping, and
sending a second talkgroup identifier to the portable communications device based on the change in the mapping.

14. The call controller of claim 9, the memory further comprising instructions, that when executed by the electronic processor perform a set of functions including:
   receiving a communication initiated from the portable communication device for a mission;
   mapping the mission to a second talkgroup; and
   initiating the communication with the second talkgroup.

15. The call controller of claim 9, wherein the function of determining the talkgroup identifier associated with the mission identifier further includes mapping the mission identifier and a role of a user of the portable communications device to the talkgroup.

16. A portable communications device comprising:
   a transceiver;
   an electronic processor; and
   a memory coupled to the electronic processor and containing instructions that, when executed by the electronic processor, perform a set of functions including:
      storing a set of mission identifiers in a second memory,
      receiving a mission identifier selection of at least one mission identifier included in the set of mission identifier,
      sending the mission identifier selection to a call controller,
      receiving, from the call controller, a talkgroup identifier associated with the mission identifier selection, and
      sending and receiving communications within a talkgroup identified with the talkgroup identifier via the transceiver.

17. The portable communications device of claim 16, the memory further comprising instructions, that when executed by the electronic processor perform a set of functions including:
   receiving a plurality of talkgroup identifiers identifying a plurality of talkgroups from the call controller,
   receiving a selection of at least one of the plurality of talkgroups,
   sending the selection of one of the plurality of talkgroups to the call controller, and
   sending and receiving communications within the one of the plurality of talkgroups via the transceiver.

18. The portable communications device of claim 16, the memory further comprising instructions, that when executed by the electronic processor perform a set of functions including:
   receiving a selection of a mission identifier list,
   sending the selected mission identifier list to a call controller, and
   receiving, from the call controller, at least one talkgroup identifier associated with each mission included in the mission identifier list.

19. The portable communications device of claim 16, the memory further comprising instructions, that when executed by the electronic processor perform a set of functions including:
   initiating a communication to a mission, and
   sending the communication to the call controller for initiating with a talkgroup associated with the mission.

20. The portable communication device of claim 16, wherein the call controller is in communication with an electronic database storing a mapping between the mission identifier selection and the talkgroup identifier based on a mapping attribute having a predetermined value, the memory further comprising instructions, that when executed by the electronic processor perform a set of functions including:
   receiving a mapping attribute associated with the talkgroup identifier, the mapping attribute having a predetermined value;
   automatically comparing a current value of the mapping attribute to the predetermined value of the mapping attribute; and
   automatically requesting a second talkgroup identifier from the call controller when the current value of the mapping attribute fails to satisfy the predetermined value of the mapping attribute.

* * * * *